United States Patent [19]
Yokota

[11] Patent Number: 5,172,986
[45] Date of Patent: Dec. 22, 1992

[54] ROLLER BEARING HAVING ROLLER HOLDING PROJECTIONS FORMED BY CALKING

[75] Inventor: Yasunori Yokota, Ebina, Japan

[73] Assignee: Nippon Thompson Co., Ltd., Tokyo, Japan

[21] Appl. No.: 739,619

[22] Filed: Aug. 1, 1991

[30] Foreign Application Priority Data

Aug. 3, 1990 [JP] Japan .................. 2-82211[U]

[51] Int. Cl.⁵ .................. F16C 33/46; B21D 53/12
[52] U.S. Cl. .................. 384/580; 29/898.067
[58] Field of Search .................. 384/580, 572, 575; 29/898.067

[56] References Cited

U.S. PATENT DOCUMENTS

| | | | |
|---|---|---|---|
| 2,772,128 | 11/1956 | Schaeffler et al. | 384/580 |
| 2,884,288 | 4/1959 | Herrmann et al. | 384/580 |
| 3,494,684 | 2/1970 | Benson | 384/580 |
| 3,802,754 | 4/1974 | Pitner | 384/580 |
| 3,878,705 | 4/1975 | Iffland | 29/898.067 X |
| 4,702,628 | 10/1987 | Watanabe | 384/580 |
| 4,797,015 | 1/1989 | Hidano | 384/580 |
| 4,978,237 | 12/1990 | Motohashi et al. | 384/580 |

FOREIGN PATENT DOCUMENTS 541554  8/1959  Belgium .................. 384/580

*Primary Examiner*—Thomas R. Hannon
*Attorney, Agent, or Firm*—Skjerven, Morrill, MacPherson, Franklin & Friel

[57] ABSTRACT

A cage and roller type roller bearing is provided. The bearing generally include a cylindrical cage and a plurality of rollers which are maintained in position by the cage. The cage includes a pair of circumferential sections and a plurality of axial sections extending between the pair of circumferential sections and spaced apart at a predetermined pitch in the circumferential direction to thereby define a plurality of windows each receiving therein a corresponding roller rotatably and generally rectangular in shape and somewhat larger in size than the roller. Each of the axial sections has its central inner portion of its inner surface removed to define an inner recess so that the axial section is divided into a relatively thin central portion and a pair of relatively thick end portions. In the preferred embodiment, the relatively thick end portion is calked to define a pair of inner and outer roller holding projections and a pair of inner and outer grooves at the inner and outer peripheral surfaces thereof, respectively. These inner and outer roller holding projections defined by calking serve to prevent the roller from slipping away from the corresponding window, and the inner and outer grooves serve as oil pockets for reserving a quantity of lubricant therein.

3 Claims, 5 Drawing Sheets

ROLLER BEARING HAVING ROLLER HOLDING PROJECTIONS FORMED BY CALKING

BACKGROUND OF THE INVENTION

1. Field of the Invention

This invention generally relates to a roller bearing, and, in particular, to a cage and roller assembly in a roller bearing suitable for use at an end of a connecting rod in an internal combustion engine.

2. Description of the Prior Art

A roller bearing is well known and used in various machines. For example, a roller bearing is used with a connecting rod of a compact internal combustion engine, for example, of a motor bike, and such a roller bearing typically includes a cage and roller assembly since it is relatively compact in size in the radial direction and it has a relatively large load bearing capacity.

One prior art example of such a roller bearing is illustrated in the Japanese Utility Model Application, No. 51-33608 (Laid-open Pub. No. 52-124353), assigned to the assignee of this application. This prior art example is so structured to include an increased number of rollers as schematically shown in FIGS. 5 and 6 herein. As shown, this prior art roller bearing includes a cage 11 having a pair of side stays 12 and 13 and a plurality of main stays extending between the pair of side stays 12 and 13 as spaced apart from one another at a predetermined pitch in the circumferential direction. A plurality of windows 14 are defined each between two adjacent ones of the plurality of main stays and each of the windows 14 receives a roller R rotatably therein Each of the main stays has a pair of side projections 16 projecting into the respective windows 14 from opposite sides thereof and these side projections 16 serve to prevent the associated rollers R from slipping away radially outwardly In addition, a roller guide portion 17 is provided on both sides at each end of each of the windows 14, and a roller holding projection 18 is formed at the inner side of each of the pair of side stays 12 and 13 as projecting axially inwardly so as to prevent the associated roller R from falling off inwardly.

However, in the above-described prior art structure, difficulty is encountered in manufacture, in particular, in forming the roller holding projections 18 which project inwardly Because of this difficulty, the roller holding projections 18 cannot be manufactured at high accuracy and thus there exists unstability in holding the roller R in its associated window 14. In extreme cases, there is a chance that the roller R will slip away from the associated window 14. If the roller holding projections 18 were to be manufactured with high accuracy, then it would push up the cost significantly.

In order to obviate the disadvantages of the above-described prior art device, there has been proposed another cage and roller assembly as disclosed in the U.S. Pat. No. 4,797,015 issued to Hidano et al. on Jan. 10, 1989, and assigned to the assignee of this application. The device disclosed in this patent has some improvements; however, there still remains some difficulty in manufacture, and, thus, there still exists a needs to improve the structure of a cage and roller assembly for use in a roller bearing.

SUMMARY OF THE INVENTION

In accordance with the present invention, there is provided a roller bearing including a cylindrically shaped cage formed with a plurality of windows and a plurality of rollers each of which is rotatably received in a corresponding one of the windows. The cage includes a pair of side stays or circumferential sections and a plurality of main stays or axial sections extending between the pair of side stays or circumferential sections and arranged at a predetermined pitch to thereby define a plurality of windows between the main stays or axial sections. Each of the axial sections is recessed at its inner side and at its central portion and thus the axial section has a relatively thin portion at its center and a relatively thick portion at each end thereof. The recessed portion extends over a predetermined distance, but short of the length of the roller. The thick portion of the axial section is approximately the same in thickness with the circumferential section.

In accordance with the main feature of the present invention, the thick portion of the axial section is partially calked at its inner surface to thereby define a pair of oppositely extending inner roller holding projections. In the preferred embodiment, an inner groove is defined by calking in the inner surface of the thick portion of the axial section and the pair of oppositely extending inner roller holding projections is formed as a result of forming the inner groove by calking. Thus, the window has a substantially rectangular shape which is somewhat larger than the outer dimensions of the associated roller, and, thus, the rectangularly shaped window has a pair of opposite side surfaces extending axially and a pair of end surfaces. The inner roller holding projections extend circumferentially and the distance between the tip ends of these oppositely extending inner roller holding projections is smaller than the diameter of the roller so that the roller is prevented from slipping away from the window inwardly. In addition, the outer peripheral surface of the axial section is partly calked to define an outer groove and a pair of oppositely extending outer roller holding projections at the ends of the outer groove as a result of calking. The distance between the tip ends of these oppositely extending outer roller holding projections is also set to be smaller than the diameter of the roller so as to prevent the roller from slipping away from the window outwardly. Preferably, these outer roller holding projections are also formed at the thick portion of the axial section and in axial alignment with the inner roller holding projections.

Therefore, it is a primary object of the present invention to obviate the disadvantages of the prior art as described above and to provide an improved roller bearing including a cage and roller assembly.

Another object of the present invention is to provide an improved roller bearing having an increased load bearing capability and a large strength and rigidity.

A further object of the present invention is to provide an improved roller bearing high in anti-friction characteristic and performance.

A still further object of the present invention is to provide an improved roller bearing that is compact in size, simple in structure, easy to manufacture, and low in cost.

Other objects, advantages and novel features of the present invention will become apparent from the following detailed description of the invention when considered in conjunction with the accompanying drawings.

DESCRIPTION OF THE PREFERRED EMBODIMENTS

Figure 1:
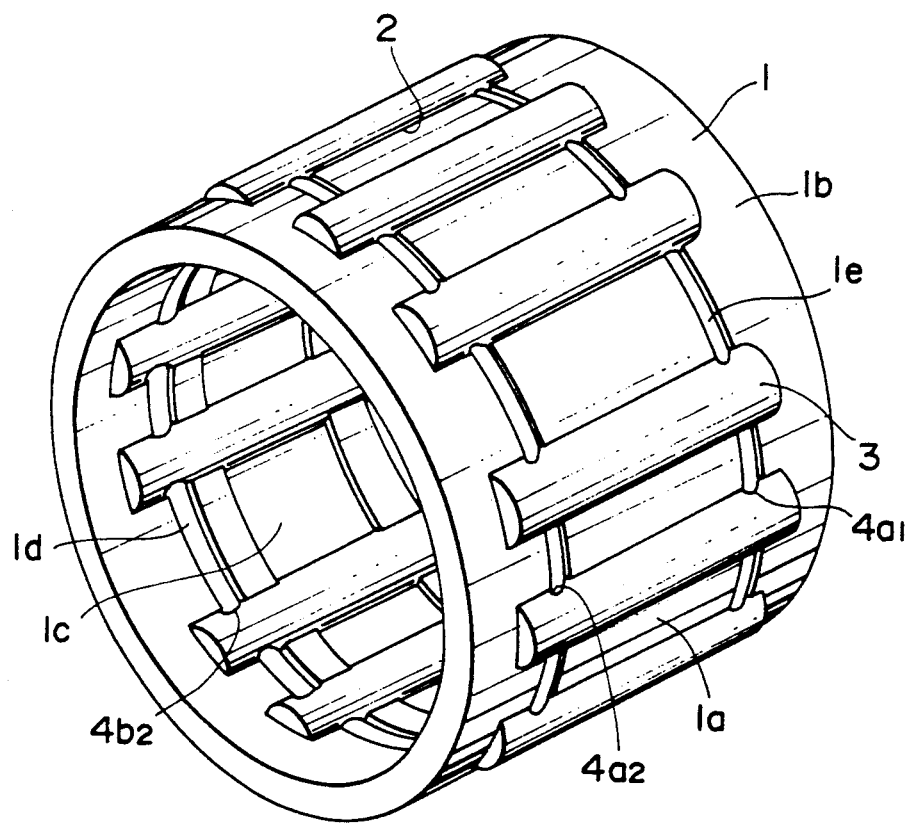
FIG. 1 is a schematic illustration showing in a perspective view a roller bearing of the cage and roller type constructed in accordance with one embodiment of the present invention.

Referring now to FIG. 1, there is schematically shown a cage and roller type roller bearing constructed in accordance with one embodiment of the present invention. As shown, the present roller bearing includes a cage 1 which is generally cylindrical in shape and which includes a pair of side stays or circumferential sections 1b and a plurality of main stays or axial sections 1a extending between the pair of circumferential sections 1b as arranged circumferentially at a predetermined pitch. Thus, a window 2 generally rectangular in shape is defined by portions of the pair of circumferential sections 1b and a pair of two adjacent axial sections 1a. A plurality of such windows 2 are defined as arranged circumferentially at a predetermined pitch, and each of such windows 2 receives therein an associated roller 3 rotatably therein. Thus, the window 2 is somewhat larger in size, i.e., in both of length and width, than the roller 3.

Figure 2A:
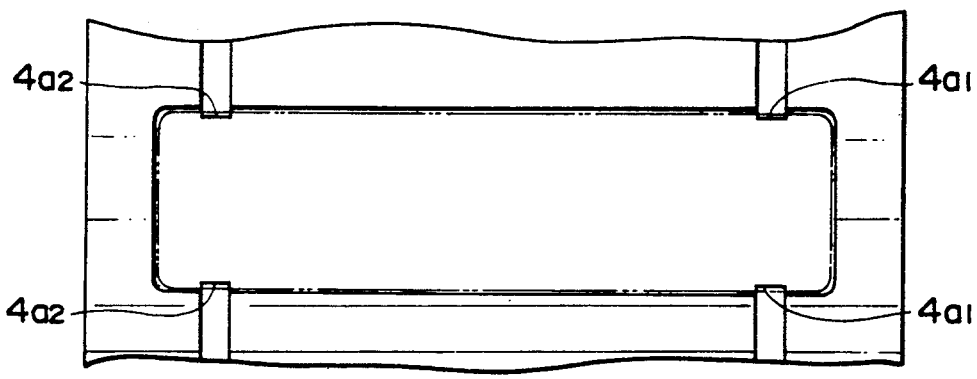
FIG. 2a is a schematic illustration showing on a somewhat enlarged view a section of the roller bearing shown in FIG. 1.
Figure 2B:
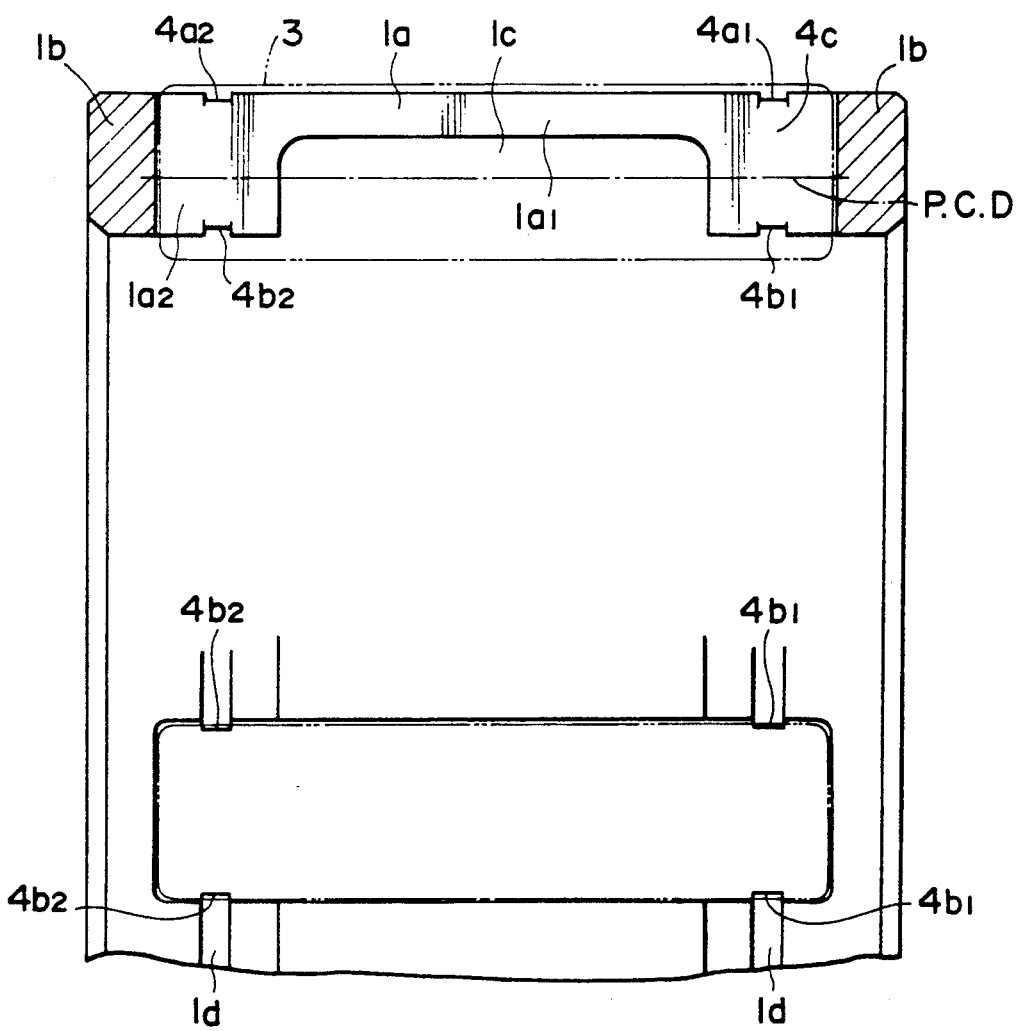
FIG. 2b is a schematic illustration showing on a somewhat enlarged view of another section of the roller bearing shown in FIG. 1.

As best shown in FIG. 2b, the axial section 1a is recessed centrally at its inner side and thus it has a relatively thin center portion 1a1 and a pair of relatively thick end portions 1a2. The relatively thick end portion 1a2 is substantially the same in thickness as the circumferential section 1b. The relatively thin portion 1a1 is recessed at its inner side such that it is prevented from coming into contact with the associated roller 3 as much as possible. Because of this lack of contact between the central portion of the axial section 1a and the associated roller 3, the friction between the cage 1 and the roller 3 is minimized, thereby allowing the roller 3 to rotate more freely. The relatively thick end portion 1a2 provides a side guide surface 4c which comes into rolling contact with the associated roller 3. Accordingly, the roller 3 is maintained in position mainly through engagement with the side guide surfaces 4c of the axial section 1a and with end guide surfaces presented by the pair of circumferential sections 1b.

Of importance, an inner groove 1d is formed on the inner peripheral surface of each of the relatively thick end portions 1a2 by calking. And, as a result of forming the inner groove 1d by calking, a pair of oppositely extending inner roller holding projections 4b1 or 4b2 is formed as an extensions of the inner groove 1d as best shown in FIG. 2b. In this manner, each of the inner roller holding projections 4b1 is formed by plastic deformation of a part of the relatively thick end portion 1a2. The distance between the tip ends of the oppositely extending inner roller holding projections 4b1 or 4b2 is set to be smaller than the diameter of the roller 3 received in the window 2 so that the roller 3 is prevented from slipping away from the window 2 radially inwardly. In one example, after forming the inner grooves 1d and inner roller holding projections 4b1 and 4b2, steps of heat treatment, grinding and polishing are carried out, and, if necessary, a step of surface treatment, such as copper or silver plating, is carried out to provide an enhanced anti-friction characteristic. Such inner grooves 1d formed by calking can serve as oil pockets for reserving therein a quantity of oil to thereby present an enhanced lubricating characteristic. In this connection, it should be noted that a calking operation to define the inner grooves 1d and the inner roller holding projections 4b1 and 4b2 is facilitated since the relatively thick end portion 1a2 is substantially the same in thickness as the circumferential section 1b. Because of this, it is also made easy to form the inner roller holding projections 4b1 and 4b2, which, in turn, contribute to form these projections 4b1 and 4b2 at high accuracy. As a result, the roller 3 can be properly and securely retained in the window 2.

As best shown in FIG. 2b, a recess 1c is defined by the relatively thin portion 1a1 and the pair of relatively thick end portions 1a2, and the recess 1c is large enough to extend beyond the pitch circular diameter (P.C.D.) of the roller 3 radially outwardly. In addition, the recess 1c extends axially short of the window 2. With this structure, the overall weight of the cage 1 is significantly reduced and the frictional contact between the cage 1 and the roller 3 is significantly reduced.

The outer peripheral surface of each of the axial sections 1a of the cage 1 is formed with a pair of outer grooves 1e by calking, and, as a result, a pair of oppositely extending outer roller holding projections 4a1 or 4a2 is formed. That is, when the outer grooves 1e are formed by calking, the axial sections 1a are partly subject to plastic deformation to thereby form outer roller holding projections 4a1 and 4a2. Each of these outer roller holding projections 4a1 and 4a2 extends circumferentially and partly into the window 2. The distance between the tip ends of the oppositely extending outer roller holding projections 4a1 or 4a2 is set to be slightly smaller than the diameter of the roller 3 so that the roller 3 is prevented from slipping away from the window 2 undesirably radially outwardly. Accordingly, the roller 3 can be maintained rotatably in position in the window 2. Preferably, these outer grooves 1e and the outer roller holding projections 4a1 and 4a2 are formed at the relatively thick end portions 1a2 of the axial sections 1a, and, most preferably, in axial alignment with the respective inner grooves 1d and the inner roller holding projections 4b1 and 4b2.

Similarly with the inner grooves 1d, the outer grooves 1e are also advantageous since they can serve as oil pockets which can reserve a quantity of oil therein. Therefore, the provision of such outer grooves 1e can provide an enhanced lubricating characteristic. It is to be noted that the outer grooves 1e are formed by calking when the outer roller holding projections 4a1 and 4a2 are formed by calking. Thus, the present invention is quite advantageous particularly from a manufacturing viewpoint since both of the outer grooves 1e and the outer roller holding projections 4a1 and 4a2 are formed by the same calking step.

Figure 3:
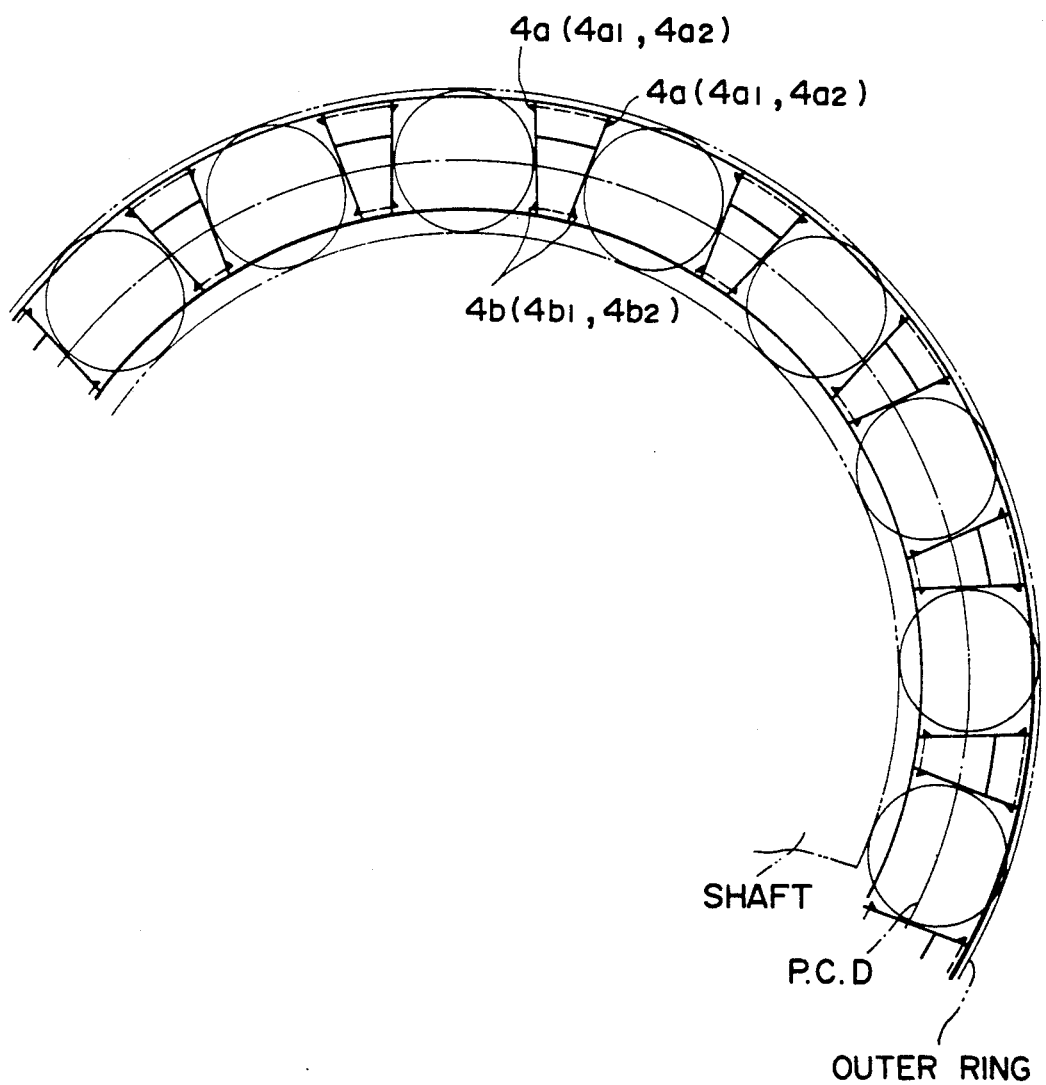
FIG. 3 is a schematic illustration showing the state when the present roller bearing is arranged between a shaft and an outer ring.

FIG. 3 illustrates a state in which the present cage and roller type roller bearing is provided between a shaft and an outer ring. In this state, the roller 3 is in rolling contact with the side guide surfaces 4c at both ends of the window 2 and guided substantially along P.C.D. As a result, in this state, the roller 3 is not brought into contact with the outer and inner roller holding projections 4a1, 4a2 and 4b1, 4b2. It is also sized such that the outer peripheral surface of the cage 1 is brought into contact with the rolling contact surface of the outer ring before the inner peripheral surface of the cage 1 is brought into contact with the shaft.

Figure 4:
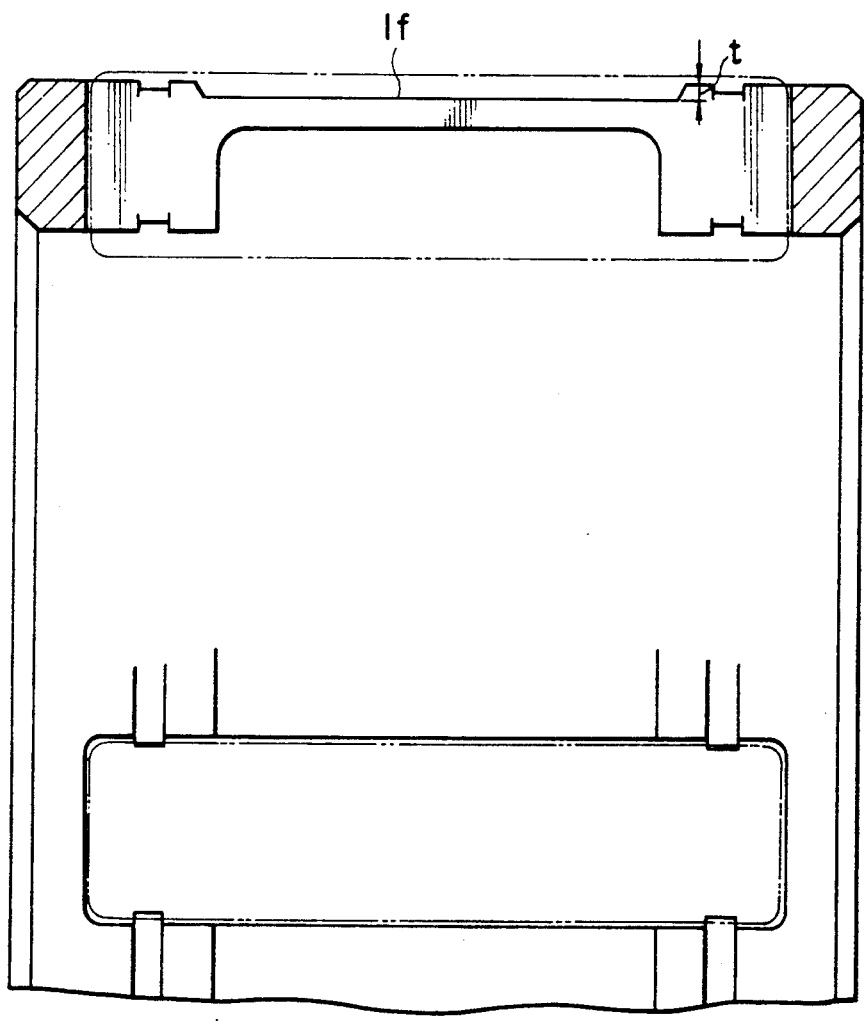
FIG. 4 is a schematic illustration showing partly in cross section a roller bearing constructed in accordance with another embodiment of the present invention.
Figure 5:
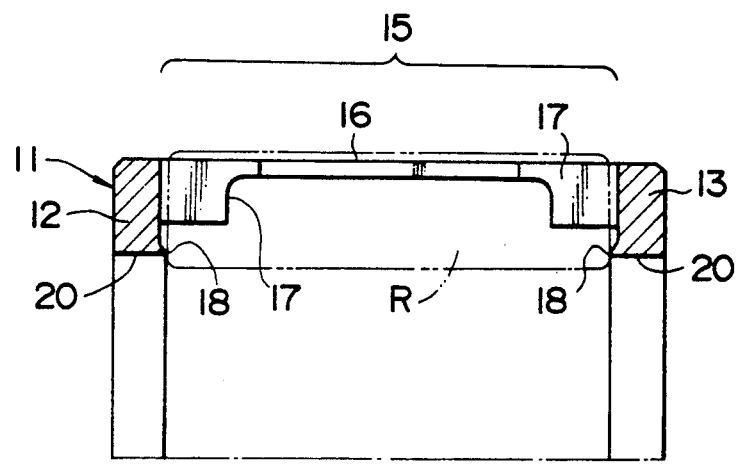
FIGS. 5 and 6 are schematic illustrations showing one example of the prior art cage and roller type roller bearing.
Figure 6:
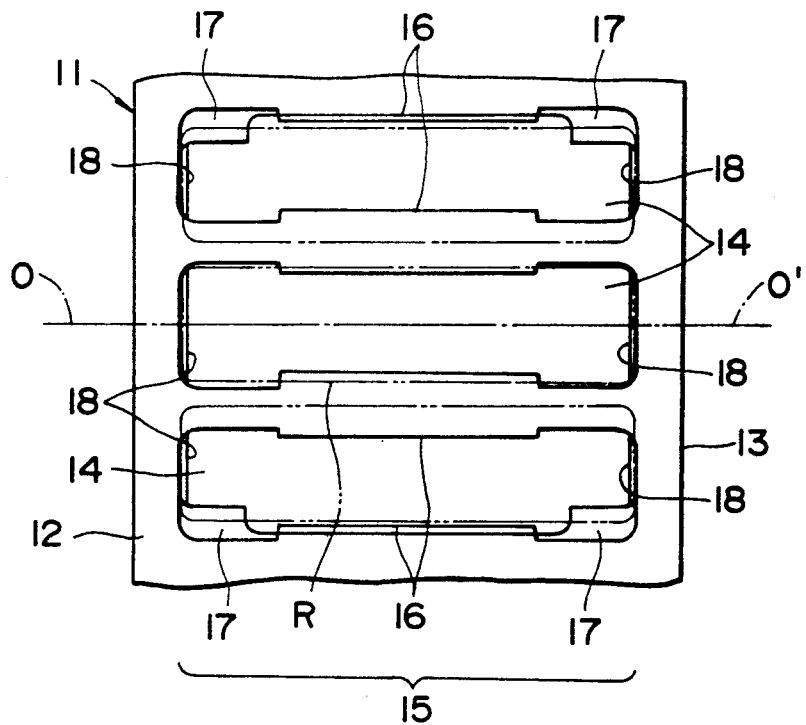

FIG. 4 illustrates another embodiment of the present invention, in which an outer recess 1f is additionally provided at the outer peripheral surface of the axial section 1a and between the outer grooves 1e. The outer recess 1f preferably has a depth of approximately 0.2 mm. With the provision of such an outer recess 1f, the contact surface area at the outer peripheral surface can be significantly reduced. Thus, a friction between the present roller bearing and the outer ring can be significantly reduced, and, also, the overall weight of the present roller bearing can also be reduced.

While the above provides a full and complete disclosure of the preferred embodiments of the present invention, various modifications, alternate constructions and equivalents may be employed without departing from the true spirit and scope of the invention. For example, a circumferentially extending ridge may be formed at the inner peripheral surface of the relatively thick portion 1a2 of the axial section 1a and this ridge may be calked to define the inner roller holding projections 4b1 and 4b2. Therefore, the above description and illustration should not be construed as limiting the scope of the invention, which is defined by the appended claims.

What is claimed is:

1. A roller bearing comprising:
a plurality of rollers, and
a cylindrical cage for holding said plurality of rollers in position, said cage comprising:
a pair of circumferential sections; and
a plurality of axial sections extending between the pair of circumferential sections and arranged spaced apart at a predetermined pitch in a circumferential direction, thereby defining a plurality of windows generally rectangular in shape at a predetermined pitch, wherein:
each of said windows receives therein a corresponding one of said plurality of rollers rotatably; and
each of said axial sections has a central inner portion of an inner surface thereof removed to thereby define a relatively tin central portion and a pair of relatively thick end portions; wherein:
said pair of relatively thick end portions form a recess with said relatively thin central portion so that said recess extends to a depth beyond the pitch circular diameter of the plurality of rollers; and
each of said pair of relatively thick end portions has inner and outer peripheral surfaces provided respectively with inner roller holding projections and an inner groove and outer roller holding projections and an outer groove which are formed by calking said inner and outer peripheral surfaces, whereby said inner and outer roller holding projections prevent a roller from slipping away from a corresponding window in which it is rotatably received.

2. The roller bearing of claim 1, wherein said outer groove and said outer roller holding projections are substantially in axial alignment with said inner groove and said inner roller holding projections.

3. The roller bearing of claim 1, wherein each of said axial sections is also formed with an outer recess by having a central outer portion of an outer surface thereof removed.

* * * * *